United States Patent
Humbard et al.

(10) Patent No.: US 6,804,585 B2
(45) Date of Patent: Oct. 12, 2004

(54) FLIGHT MANAGEMENT SYSTEM AND METHOD FOR PROVIDING NAVIGATIONAL REFERENCE TO EMERGENCY LANDING LOCATIONS

(76) Inventors: John Jay Humbard, 1902 E. 27th Ter., Pittsburg, KS (US) 66762; Joseph Putman, 9526 W. 21st St., N., Witchita, KS (US) 67205

( * ) Notice: Subject to any disclaimer, the term of this patent is extended or adjusted under 35 U.S.C. 154(b) by 0 days.

(21) Appl. No.: 10/175,478

(22) Filed: Jun. 19, 2002

(65) Prior Publication Data

US 2003/0060940 A1 Mar. 27, 2003

Related U.S. Application Data

(60) Provisional application No. 60/299,261, filed on Jun. 19, 2001.

(51) Int. Cl.$^7$ .............................. G08G 5/02; G08G 5/00; G01S 1/16
(52) U.S. Cl. ............................. 701/3; 701/16; 340/961
(58) Field of Search ......................... 701/3, 9, 16, 120, 701/301, 17, 14, 300; 340/961, 947, 972, 973, 974, 975, 977, 979; 342/29, 32, 33, 455, 357.03, 357.06

(56) References Cited

U.S. PATENT DOCUMENTS

| | | | | |
|---|---|---|---|---|
| 3,711,826 A | * | 1/1973 | La Russa | 340/27 NA |
| 3,781,891 A | * | 12/1973 | Moose | 343/108 R |
| 5,057,835 A | * | 10/1991 | Factor et al. | 340/995.27 |
| 5,361,212 A | * | 11/1994 | Class et al. | 364/428 |
| 5,842,142 A | | 11/1998 | Murray | 701/16 |
| 5,884,223 A | * | 3/1999 | Tognazzini | 701/301 |
| 6,199,008 B1 | * | 3/2001 | Aratow et al. | 701/120 |
| 6,219,592 B1 | | 4/2001 | Muller | 701/9 |
| 6,317,690 B1 | * | 11/2001 | Gia | 701/301 |
| 6,438,469 B1 | * | 8/2002 | Dwyer et al. | 701/16 |
| 6,573,841 B2 | * | 6/2003 | Price | 340/963 |

* cited by examiner

*Primary Examiner*—Tan Q. Nguyen
*Assistant Examiner*—Dalena Tran
(74) *Attorney, Agent, or Firm*—Mark D. Bowen, Esq.; Stearns Weaver Miller Weissler Alhadeff & Sitterson, P.A.

(57) ABSTRACT

An aviation navigational system and method for predicting glide range for an aircraft for specific airports and other potential emergency landing locations in proximity to the aircraft. Information is presented to the pilot by complementing a conventional moving map display with symbols centered on each landing location. GPS altitude, airport elevation, and the aircraft's glide ratio are factored into an equation to determine glide range for each airport within proximity to the aircraft. A circular symbol representing the glide range boundary is displayed around each airport. Each circular symbol represents a sectional view of an imaginary inverted cone, having the apex thereof centered on a given landing location. The size and shape of the cone is based on the gliding performance of the aircraft and the altitude differential between the aircraft and the target landing location. As the altitude differential increases the radius of the circle increases. Conversely as the altitude differential decreases, the radius of the circle decreases. As long as the aircraft is anywhere within any one of the three-dimensional inverted cones displayed, as represented by one or more circles on a two dimensional display, it can safely glide to the landing location. This display concept is selectively referred to herein as "cones of safety."

5 Claims, 4 Drawing Sheets

FLIGHT MANAGEMENT SYSTEM AND METHOD FOR PROVIDING NAVIGATIONAL REFERENCE TO EMERGENCY LANDING LOCATIONS

CROSS REFERENCE TO RELATED APPLICATIONS

This application claims the benefit of provisional U.S. Patent Application No. 60/299,261, filed Jun. 19, 2001.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to aviation navigation and flight management systems, and more particularly to a navigational flight management system and method for dynamically displaying airports in proximity to the aircraft along with glide range symbology for each airport.

2. Description of the Background Art

Various aviation navigation and flight management systems are known in the art for providing pilots with a wide variety of navigational data. Some navigation systems incorporate features that provide pilots with information about alternate landing destinations. Such systems typically contain a database of airports from which a list of alternate landing locations, such as airports and airstrips, may be selected and displayed. Such systems may also include proximity data such as the distance to each airport, estimated time of arrival, and fuel requirements. The alternate landing location information is typically only used in emergency situations, such as weather avoidance, onboard emergency and/or engine problems, wherein the aircraft would be prevented from landing at the intended destination.

The navigational systems of the background art, however, suffer from a number of significant disadvantages. One primary disadvantage with prior art navigation systems involves the manner in which information pertaining to emergency landing locations is calculated and/or presented to the pilot. For example, in certain geographic areas there may be a relative large number of airports within range of the aircraft. Thus, in an emergency situation the systems of the background art require the pilot to sort through a vast array of numerical data while attempting to find the most suitable alternate landing location depending upon the emergency at hand. As should be apparent, the selection of an alternate landing location and implementation of course correcting maneuvers using such systems requires a significant amount of effort by the pilot.

The task is vastly more complicated in situations wherein engine failure limits the pilot's options to those locations within gliding range while substantially reducing the time available for the pilot to make and implement flight plan alterations to divert to an alternate emergency landing location. Although aircraft will glide upon experiencing a total loss of engine power, the glide radius is dependent upon the glide ratio characteristics of the particular aircraft and the above ground level ("AGL") altitude. For example, a typical light aircraft is capable of gliding approximately 10 miles for every 1.0 mile of altitude lost. Thus, a typical light aircraft at 15,000 feet (approximately 3 miles) is capable of safely gliding approximately 30 miles to a landing location without engine power, assuming the landing location and terrain are at or near sea level. Thus, the aircraft's gliding range is a function of the aircraft's glide ratio and altitude above ground level ("AGL"). As should be apparent, however, other factors such as wind conditions can effect an aircraft's gliding characteristics.

For any given aircraft flying at altitude the predicted maximum glide range for the aircraft may be represented by an imaginary circle, representing the maximum glide distance for the aircraft, transposed over the underlying terrain with the aircraft located at the center. Any landing location within the glide range circle is an available landing location within gliding range in the event of a sudden loss of engine power. As altitude increases, the radius of the glide range circle increases; conversely, as altitude decreases so does the radius of the glide range circle.

When a single engine aircraft experiences engine failure the pilot must quickly ascertain the best emergency landing location within gliding range and make the appropriate control inputs to divert to the emergency landing location. In such situations, requiring the pilot to sift through the vast array of numerical data presented by some prior art flight management systems consumes precious time, diverts the pilot's attention from other matters during a time of crisis, and is thus not considered an optimal means of conveying the information in such situations. The background art further reveals flight management systems that display the glide range of the aircraft by generating and electronically displaying a circle around the aircraft as discussed hereinabove. If an airport, or other suitable landing location, is within the circle, then it is within gliding distance. While such a graphical representation of glide range is generally sufficient for present awareness and indication, it is of little assistance in providing the pilot with the availability of future potential target landing areas, and does not assist the pilot in selecting and plotting a course wherein emergency landing options are maximized for the duration of the flight. In addition, such systems fail to take into account differing elevations of the respective airports. The flight management systems known in the art simply fail to provide a system that provides a pilot with real time altitude dependent gliding ranges to various alternate potential landing locations.

Accordingly, there exists a need for an improved flight management system capable of providing a pilot with an improved graphical representation of alternate landing locations within gliding distance.

There also exists a need for a flight management system that simultaneously provides the pilot with glide ranges to alternate landing locations for use in evaluating future course options.

BRIEF SUMMARY OF THE INVENTION

The present invention provides a flight management system and method capable of providing the pilot with a real time display of various landing locations within gliding range in a format that assists the pilot in evaluating both present and future course options thereby maximizing safety. The present invention provides an improvement to known flight management systems by simultaneously displaying gliding range information for a number of alternate landing locations thereby providing the pilot with current and future emergency landing options in the event of sudden engine failure.

The present invention presents information to the pilot by complementing the flight management system's conventional moving map display with airports and other landing locations enhanced to include circular symbols centered on each landing location. Each circular symbol represents a sectional view of an imaginary inverted cone, having the apex thereof centered on its respective airport. The size and shape of the cone is based on the gliding performance of the aircraft and the altitude differential between the aircraft and that particular landing location. As the altitude differential increases the radius of the circle increases. Conversely as the altitude differential decreases, the radius of the circle decreases. Each three dimensional inverted cone is represented as a circle having the airport at the center for each airport displayed. As long as the aircraft is anywhere within any one of the three-dimensional inverted cones displayed, as represented by one or more circles on a two dimensional display, it can safely glide to the landing location. This display concept is selectively referred to herein as "cones of safety." The present invention thus provides a flight management system that generates and displays cones of safety for each landing location, e.g. airport and/or landing strip, appearing on the flight management display. By displaying glide range information in this manner the pilot is better able to plot a course that maximizes time within cones of safety. The invention is suitable for incorporation with various existing flight management systems, and cones of safety may be displayed in an overlaid manner along with other useful navigational information.

The present invention maintains real time representations of cones of safety for each landing location displayed on a GPS/GIS enabled dynamic navigational map generated by the flight management system. Thus, unlike glide range displays that are centered on the aircraft as disclosed in the background art, the present invention generates circular glide range displays that are centered on each potential landing area. If the aircraft is operating in an area of overlapping glide range circles, then multiple options are available for an emergency landing as the aircraft is within gliding range of each airport associated with the overlapping cones of safety. In addition, a significant improvement is realized in that by simultaneously displaying cone of safety information for each potential landing location, the pilot is able to chart a course that maximizes emergency landing options. By referencing the various cones of safety displayed, the pilot is able to execute a flight plan having a course that maximizes the flight time within cones of safety thus maximizing emergency landing options while minimizing flight time void of emergency landing options. Thus, the pilot is provided with advance warning if the projected course does not intersect cones of safety and is thus void of emergency landing airports. As should be apparent, providing such useful information in advance allows the pilot to maximize safety by altering course so as to maximize flight time within one or more cones of safety.

Accordingly, it is an object of the present invention to provide an improved flight management system.

Still another object of the present invention is to provide a flight management system capable of displaying glide range symbology relative to potential emergency landing locations.

Yet another object of the present invention is to provide a flight management system adapted to calculate and display glide range information, based on altitude and aircraft glide ratio, for a plurality of landing locations.

Still further objects and advantages will become apparent from a consideration of the ensuing description and drawings.

DETAILED DESCRIPTION OF THE INVENTION

Figure 1:
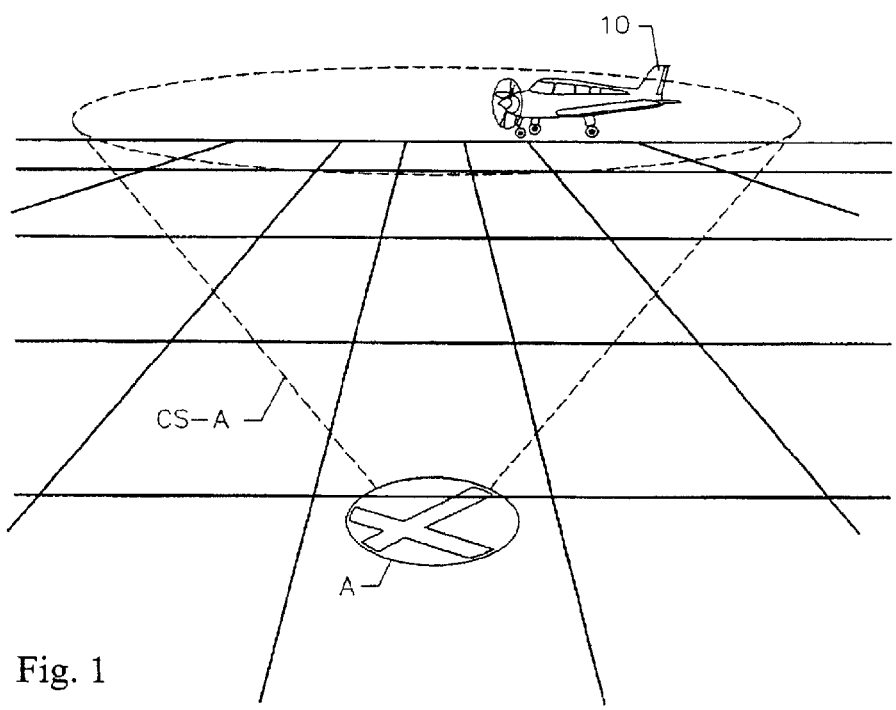
FIG. 1 illustrates the cones of safety concept by depicting an aircraft relative to an airport and the cone of safety associated with the airport.

With reference now to the drawings, FIGS. 1–5 illustrate a flight management system in accordance with the present invention. The flight management system includes an electronic display enabled with moving map GPS navigational data adapted to calculate and display "cones of safety" for various airports along the flight route. FIG. 1 depicts an aircraft relative to an airport with the cone of safety depicted in phantom view to illustrate the cones of safety concept. The present invention provides a flight management system and method capable of providing the pilot with a moving map display depicting the locations of multiple airports, which locations are complemented with glide range identification symbology to assist the pilot in evaluating both present and future course options thereby enabling the pilot to execute a flight plan wherein the availability of emergency landing locations is maximized.

Figure 2:
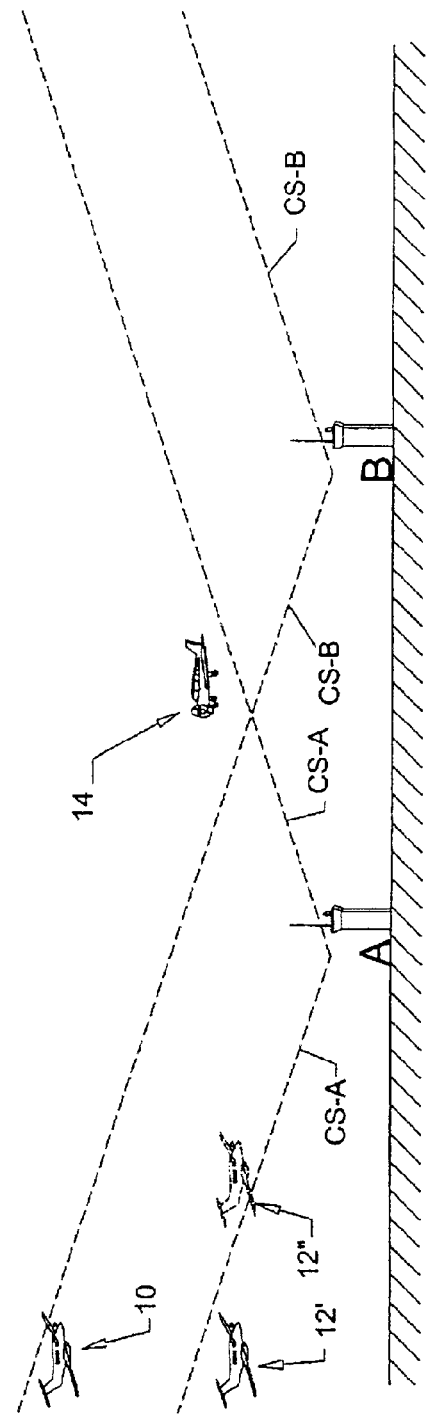
FIG. 2 is a side view illustrating aircraft relative to cones of safety for airports designated as "A" and "B;"
Figure 3:
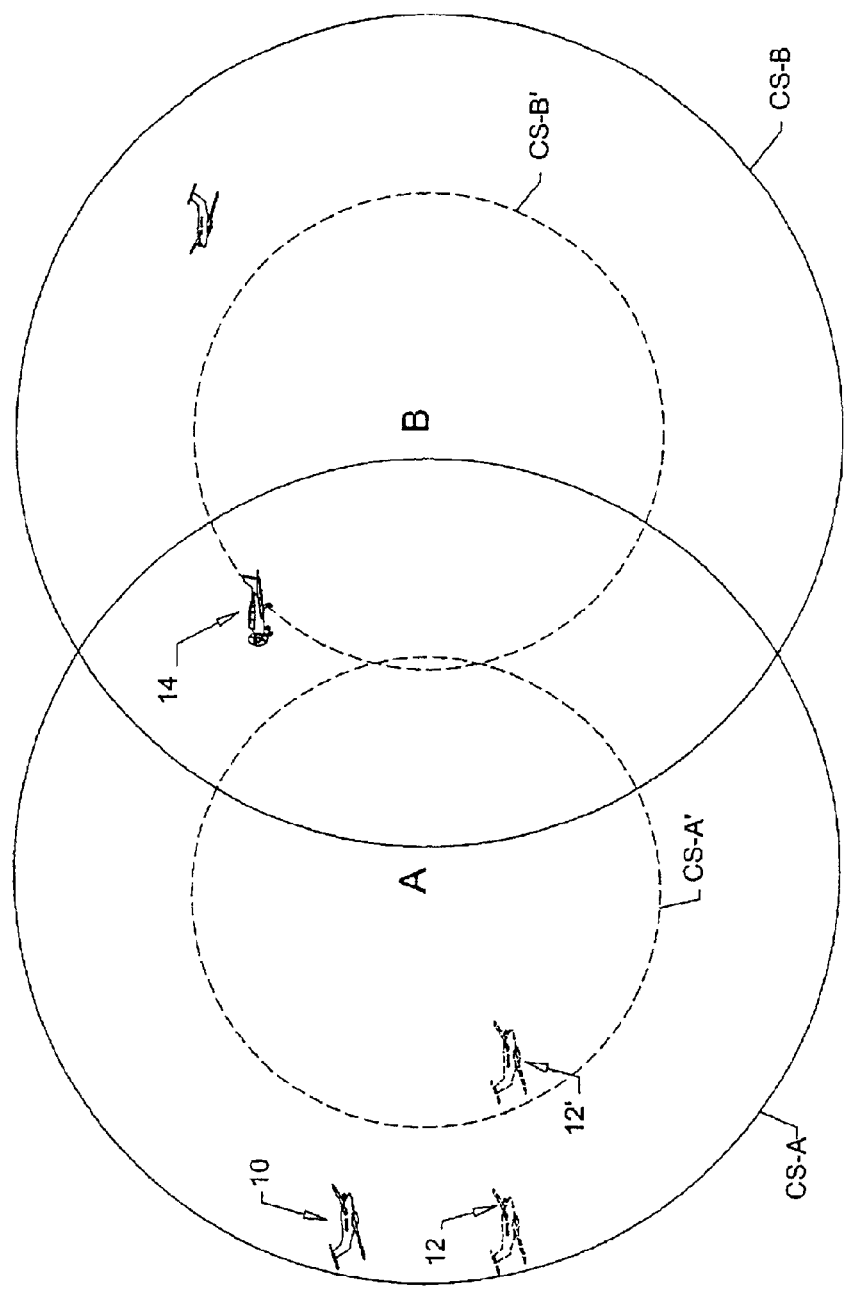
FIG. 3 is a top plan view illustrating aircraft relative to cones of safety for airports designated as "A" and "B;"

The cone of safety method is suitable for use with a wide variety of electronic aircraft navigational instruments. More particularly, the present invention may be incorporated into the flight management avionics to electronically present information to the pilot by via a visual display associated with the aircraft's flight management system so as to depict moving map displays including symbols representing airports, each of which is surrounded by a circle, the diameter of which represents a cross-section of each airport's cone of safety as it relates to the aircraft in terms of relative geographic position and altitude. As best depicted in FIGS. 2 and 3, each circle displayed represents a sectional view of an imaginary inverted 3-dimensional cone having the apex thereof centered on the airport. The shape of the cone is determined based on the gliding performance of the aircraft (e.g. established glide ratio), and the circular cross section depicted is determined based on the altitude differential between the aircraft and the airport. Accordingly, as the altitude differential increases the radius of the glide range circle depicted on the display increases. Conversely as the altitude differential decreases, the radius of the glide range circle decreases. The glide ratio information may be provided as a user input, and preferably may be adjusted to provide a more conservative glide range estimate. As long as the aircraft is anywhere within this three-dimensional inverted cone, as represented by a circle on a two dimensional display, it can safely glide to the landing location.

In a preferred embodiment, the present invention represents these cones on the aircraft's electronic navigation map by depicting circular cross-sections of each cone of safety, as computed by an onboard computer, on an electronic GPS enabled moving map navigational display. In a preferred embodiment the electronic device is a GPS enabled electronic personal digital assistant, such as an IPAQ device available from Compaq Computer Corporation.

At a minimum, the computer calculations are based on the current altitude of the aircraft and its glide ratio. The radius of each circle may be determined according to the following formula:

Radius=(Aircraft Altitude−Airport Altitude)×Aircraft Glide Ratio

Aircraft Glide Ratio is preferably an established value for the specific make and model aircraft, namely the published glide ratio. This value is input by the user into the flight management computer.

Aircraft Altitude is a streaming input variable representing GPS altitude (above sea level) and may be obtained as a GPS output signal from the aircraft's GPS system.

Airport Altitude for any given airport, is a known value representing the elevation of the airport above sea level and may be obtained from an airport database accessible by the flight management system.

FIG. 1 illustrates the cone of safety concept by depicting an aircraft, referenced as 10, relative to an airport, referenced as "A," with the imaginary cone of safety depicted by dashed lines and referenced as "CS-A". FIG. 2 is a side elevational view illustrating cones of safety, referenced as "CS-A" and "CS-B" in connection with first and second airports, referenced as "A" and "B" respectively. In addition, aircraft are depicted at various distances and altitudes relative to airports "A" and "B." For illustration purposes the aircraft depicted in FIG. 2 are assumed to have equivalent glide ratios, such that the cones of safety shown apply to each aircraft depicted. As noted hereinabove, the shape of any given cone of safety depends on the glide characteristics of the particular aircraft. Accordingly, the shape of the cone of safety will depend on the gliding characteristics of the aircraft. More particularly, the cone of safety for any given airport and altitude will be larger for aircraft with high glide ratio than for an aircraft with a low glide ratio.

As best depicted in FIG. 2, aircraft 10 is within the cone of safety for airport "A" (referenced as "CS-A") and is outside the cone of safety for airport "B" (referenced as "CS-B"). In addition, another aircraft, referenced as 12, is depicted in a first position 12' wherein the aircraft is outside CS-A and a second position 12" wherein the aircraft is inside CS-A. Accordingly, in an emergency aircraft 12 would be able to glide to airport "A" from position 12" but not from position 12'. Finally, aircraft 14 is simultaneously within the cones of safety for both airports, i.e. within CS-A and CS-B, and thus able to glide to either airport in an emergency.

FIG. 3 illustrates a top plan view depicting cones of safety for airports "A" and "B," again referenced as "CS-A" and "CS-B." The cones of safety for aircraft 10 are represented by the solid circular symbols, referenced as CS-A and CS-B, while the cones of safety for aircraft 12 are represented by the broken line circles, referenced as CS-A' and CS-B'. As noted by reference to FIG. 2, aircraft 10 is at a higher altitude than aircraft 12. Aircraft 10 is within the cone of safety for airport "A." However, aircraft 12 is only within the cone of safety for airport "A" (CS-A') at position 12' as represented by the dashed circle, due to the reduced glide range resulting from the lower altitude. Similarly aircraft 14 is within overlapping cones of safety for airports "A" and "B," namely, CS-A and CS-B.

Figure 5:
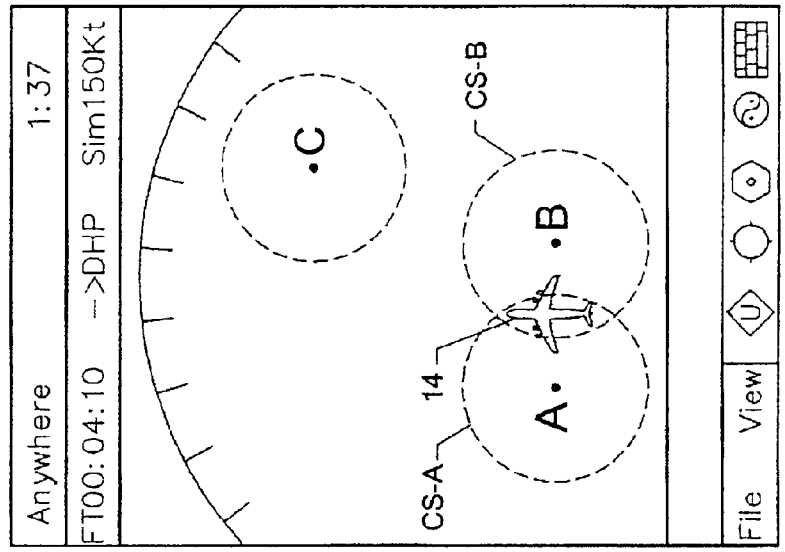
FIG. 5 depicts an alternate display thereof.
Figure 4:
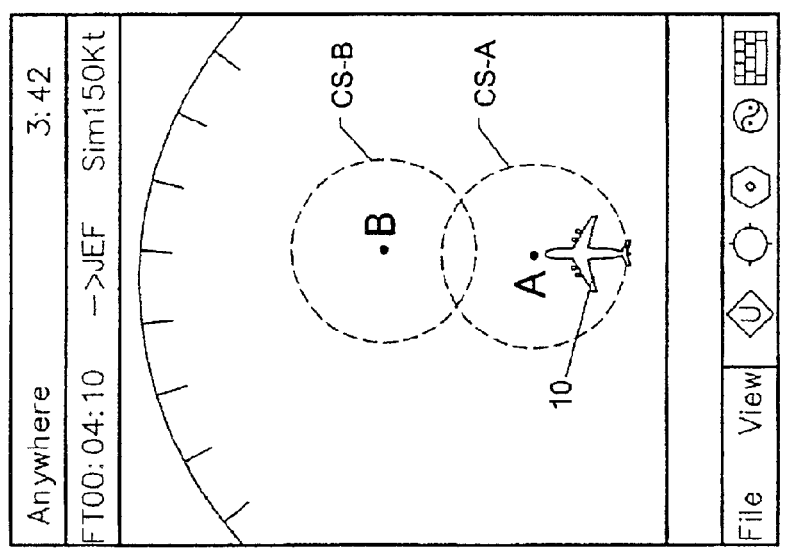
FIG. 4 depicts an aircraft electronic navigational instrument enabled with GPS moving map capability adapted to display the cones of safety for various airports.

FIGS. 4 and 5 depict electronic navigation displays adapted with the cones of safety technology disclosed herein. As noted hereinabove, the present invention maintains real time representations of cones of safety for each landing location displayed on the navigational map generated by the flight management system. More particularly, FIGS. 4 and 5 depict the cones of safety method and the associated flight management computer displays having two-dimensional circular representations of various cones of safety superimposed thereon. Unlike glide range displays that are centered on the aircraft as disclosed in the background art, the present invention generates circular glide range displays that are centered on each potential landing area. If the aircraft is operating in an area of overlapping glide range circles as depicted in FIG. 5 then multiple options are available for an emergency landing as the aircraft is within overlapping cones of safety. In addition, by simultaneously displaying cone of safety information for each potential landing location, the pilot is able to chart a course that maximizes emergency landing options. Conversely, the pilot is provided with advance warning if his projected course is void of emergency landing options. Providing such useful information in advance allows the pilot to alter the course so as to maximize flight time within one or more cones of safety.

The present invention further contemplates alternate embodiments having more advanced options and features. For example, in an embodiment that accounts for wind speed and direction the circles may be shifted to an off-center position relative to the airport and/or modified into a generally elliptical shape wherein the glide range is elongated when the aircraft is expected to encounter a tail wind or head wind. In such situations, the cones of safety will generally be shifted toward the direction from which the wind is blowing to more accurately reflect a shortened available glide range into a headwind, or a slightly longer available glide range with a tail wind. In such an embodiment wind data may be obtained from any suitable source and uploaded to the aircraft as a streaming and/or intermittent variable. For example, with airspeed and magnetic heading input the flight management computer can calculate wind factors using GPS derived ground speed and ground track parameters. The flight management will then compute the shape of the respective cones of safety. In addition, the circles may be truncated or otherwise modified where the terrain (e.g. mountains, obstacles) would prevent the aircraft from safely gliding to a given airport from a given direction.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

We claim:

1. An electronic aviation flight navigation system comprising:

a computer having an electronic display for use onboard an aircraft, said computer enabled with moving map GPS for displaying navigational positioning information;

means for displaying an airport location relative to said aircraft along a flight path on a moving map display;

means for calculating a glide range for the aircraft based on the aircraft's glide ratio and the altitude differential between said aircraft and said airport by obtaining the altitude of the aircraft above sea level from GPS data, obtaining the altitude of the airport above sea level from a database, calculating the differential between said airport altitude and said aircraft altitude, and multiplying said differential by said glide ratio; and means for displaying a generally circular symbol having a radius coresponding to said glide range and centering said circular symbol on said airport, thereby providing an indication of whether the aircraft is within gliding range of said airport.

2. A method for generating and displaying aviation navigational information comprising:

receiving data from a GPS system and determining the approximate latitude, longitude, and altitude above sea level of an aircraft;

receiving data from a database including the latitude, longitude, an elevation of airports above sea level;

displaying a moving map depicting the position of said aircraft relative to airports in proximity to said aircraft;

calculating a glide range for said aircraft relative to each of said airports by determining the altitude differential between said aircraft and each of said airports, and multiplying said altitude differential for each of said airports by the glide ratio corresponding to said aircraft;

displaying a generally circular symbol around and centered on each of said airports, said symbol having a radius corresponding to said calculated glide range.

3. A method for generating and displaying aviation navigational information according to claim 2 further comprising:

receiving data corresponding to wind speed and direction for each displayed airport;

shifting said generally circular symbols for each displayed airport toward the direction from which the wind is blowing to reflect a shorter available glide range into a head-wind, or a longer available glide range with a tail-wind.

4. A method for generating and displaying aviation navigational information according to claim 2 further comprising:

receiving information regarding the location and height of obstacle in proximity to displayed airports;

modifying the shape of said circular symbols when said obstacles would prevent the aircraft from safely gliding to an airport from a given direction.

5. An aircraft moving map information system for providing a visual display of airports to the pilot, the moving map information system comprising:

position means for receiving signals representative of the position and elevation of the aircraft;

airport data means for storing airport data representative of the locations of airports;

a cockpit display; and glide range means, responsive to said position means and said airport data means, for calculating a glide range for each airport displayed by obtaining altitude information for the aircraft from a GPS system, obtaining altitude information for each airport displayed, calculating the differential between said airport altitude and said aircraft altitude, and multiplying said differential by said glide ratio to determine glide range, said glide range corresponding to the radius of a circular symbol displayed around each airport displayed.

* * * * *